United States Patent
Altemark et al.

(10) Patent No.: US 9,416,772 B2
(45) Date of Patent: Aug. 16, 2016

(54) MOTOR LOAD REDUCTION IN A WIND POWER PLANT

(75) Inventors: Jens Altemark, Rendsburg (DE); Heinz-Hermann Letas, Susel/Gross Meinsdorf (DE); Eckart Hopp, Schulldorf (DE); Thomas Kruger, Westerronfeld (DE)

(73) Assignee: SENVION SE, Hamburg (DE)

( * ) Notice: Subject to any disclaimer, the term of this patent is extended or adjusted under 35 U.S.C. 154(b) by 279 days.

(21) Appl. No.: 12/689,409

(22) Filed: Jan. 19, 2010

(65) Prior Publication Data
US 2010/0181769 A1    Jul. 22, 2010

(30) Foreign Application Priority Data
Jan. 20, 2009  (DE) .......................... 10 2009 005 516

(51) Int. Cl.
| H02P 9/04 | (2006.01) |
| H02P 29/02 | (2016.01) |
| F03D 7/02 | (2006.01) |
| F03D 7/04 | (2006.01) |

(52) U.S. Cl.
CPC .............. F03D 7/0276 (2013.01); F03D 7/028 (2013.01); F03D 7/0224 (2013.01); F03D 7/042 (2013.01); F05B 2270/335 (2013.01); F05B 2270/602 (2013.01); Y02E 10/723 (2013.01)

(58) Field of Classification Search
CPC ..... F03D 7/0224; F03D 7/0276; F03D 7/028; F03D 7/042; Y02E 10/723

USPC .......... 290/44, 55; 416/1, 7; 415/1, 2.1, 4.1, 415/4.2, 4.4, 4.5; 700/290, 287
See application file for complete search history.

(56) References Cited

U.S. PATENT DOCUMENTS

| 7,560,823 | B2 * | 7/2009 | Schellings ...................... 290/44 |
| 2004/0076518 | A1 * | 4/2004 | Drake ...................... F03D 1/00 416/10 |
| 2004/0081551 | A1 | 4/2004 | Wobben |
| 2006/0002791 | A1 * | 1/2006 | Moroz .................. F03D 7/0204 416/1 |
| 2007/0176428 | A1 * | 8/2007 | Nagao ............................. 290/44 |
| 2008/0131279 | A1 * | 6/2008 | Behnke et al. .................. 416/26 |

FOREIGN PATENT DOCUMENTS

| CA | 2655637 | 1/2008 |
| CN | 101012808 A | 8/2007 |
| CN | 101096941 | 1/2008 |

(Continued)

OTHER PUBLICATIONS

Hau, Erich; "Windkraftanlagen" (Wind Power Plants), 4th edition, Springer-Verlag, pp. 346 ff.

(Continued)

Primary Examiner — Tulsidas C Patel
Assistant Examiner — Viet Nguyen
(74) Attorney, Agent, or Firm — Rankin, Hill & Clark LLP

(57) ABSTRACT

A wind power plant is characterized in that a measurement device (18) is provided for the determination of the load on an electric motor (13, 14), wherein the control device (16, 17) reduces the load on the motor (13, 14) by reducing the rotational speed of the rotor (11), by changing the blade angle of the at least one rotor blade (12, 12') and/or by reducing the output of the wind power plant (10) when a preselectable first load limit of the electric motor (13, 14) is exceeded.

25 Claims, 5 Drawing Sheets

(56) References Cited

FOREIGN PATENT DOCUMENTS

| | | |
|---|---|---|
| CN | 101096942 A | 1/2008 |
| DE | 10307929 A1 | 9/2004 |
| DE | 102004051054 A1 | 4/2006 |
| DE | 102006029640 | 1/2008 |
| DE | 102006034251 A1 | 1/2008 |
| EP | 0995904 | 4/2000 |
| EP | 0995904 A2 | 4/2000 |
| EP | 1362183 B1 | 11/2003 |
| EP | 1882852 A1 | 1/2008 |
| EP | 2037119 | 3/2009 |
| EP | 2037119 A1 | 3/2009 |
| WO | 02/064973 | 8/2002 |

OTHER PUBLICATIONS

English Translation of Chinese Office Action issued May 6, 2013, Application No. 201010142108.6, 3 pages.

Caselitz, P., et al; Reduction of Fatigue Loads on Wind Energy Converters by Advanced Control Methods, European Wind Energy Conference, Oct. 1, 1997, pp. 555-558, XP008031751.

* cited by examiner

MOTOR LOAD REDUCTION IN A WIND POWER PLANT

BACKGROUND OF THE INVENTION

1. Field of the Invention

The invention relates to a wind power plant with a rotor and at least one angle-adjustable rotor blade and an electric motor, in particular an asynchronous motor, for the movement of a moveable part of the wind power plant, wherein the wind power plant also has a control device. The moveable part can typically be a nacelle, which should be pointed into the wind by adjusting its azimuth angle, or a rotor blade, which should be adjusted with respect to its blade angle, which is also called the pitch angle. The invention also relates to a method for operating a wind power plant with a rotor and at least one angle-adjustable rotor blade, an electric motor, in particular an asynchronous motor, and with a control device.

2. Description of Related Art

A motor-driven yaw drive of the nacelle for a wind power plant is generally known. For example in the textbook by Erich Hau entitled "Windkraftanlagen" (Wind Power Plants), 4th edition, Springer-Verlag, pages 346 ff. a yaw drive system is also called an azimuth adjustment system. This system serves to automatically align the rotor and the nacelle according to the wind direction. There is an independent assembly in the wind power plant, which forms the transition from the nacelle to the top part of the tower from a constructive point of view. The adjustment device hereby turns the nacelle with the rotor mainly around the longitudinal axis of the tower, i.e. around the azimuth angle. For this, an actuating drive in the form of an electrical motor, which is frequently designed as an asynchronous motor, is provided as well as a gear box and a brake.

During the operation of a wind power plant, in particular in turbulent winds depending on the yaw angle of the rotor, very high forces and thus very high torques, so-called yawing moments or yaw moments, can occur. These very high torques can occur both during a yaw movement of the nacelle and when the nacelle is not moving. During yaw movement of the nacelle, these very high torques can lead to power peaks in the drive motors, which reduce the lifespan of the motors and the gear box associated with the motors and also trigger a motor protection switch, which automatically leads to the shutdown of the wind power plant, since the motor protection switch is generally part of the safety chain of the wind power plant. The restart of the motor in a wind power plant is then relatively time-consuming and leads to relatively high power generation outages of the wind power plant.

Corresponding problems can also occur in the drive motors of the angle adjustment of rotor blades. Circumstances in which the motor protection switch is triggered can also occur here in correspondingly turbulent winds, so that further adjustment of the rotor blade is no longer possible, which can also lead to dangerous situations or to the shutdown of the wind power plant. For this reason, relatively largely dimensioned electric motors are normally used for the blade angle adjustment of the rotor blades or several motors work simultaneously or parallel to perform the adjustment of the rotor blade and also the adjustment of the azimuth angle of the nacelle.

EP 1 362 183 B1 discloses an azimuth drive of a wind power plant, in which a control of the rotor blade adjustment is performed depending on a deviation between the determined wind direction and the recorded azimuth position and depending on the deflection of a tower of the wind power plant from the vertical in a floating wind power plant. A force imbalance between different rotor blades is hereby utilized so that an azimuth drive in the form of an electric motor does not need to be turned on or only needs low power in order to achieve an azimuth movement.

A wind power plant with a nacelle and a rotor and at least one rotor blade adjustable around its longitudinal axis is known from EP 1 882 852 A1, wherein an adjustment device is provided, via which an azimuth alignment of the nacelle or a pitch alignment of the at least one rotor blade can be set in a motor-driven manner, wherein the adjustment device has at least one motor and wherein a controller is provided for the motor, which limits the occurring torque on the motor to a maximum predetermined value. A stronger motor is hereby used, which results in a higher breakdown torque, which would overload the gear box if used without torque limiting. Above a maximum holding torque, a slipping through of the electrical brake, which is used as an operating brake, is tolerated. During the designing of the gear box for maximum torque, a slipping through of the electro brake is already tolerated at low torque values. The torque of the motor is limited through activation with different frequencies.

DE 103 07 929 A1 discloses an arrangement for the rotation of a machine nacelle, in particular for a wind power plant, which has a nacelle mount for the rotatable mounting of the machine nacelle on a tower and at least one drive for the rotation of the machine nacelle with respect to the tower, wherein the drive is arranged on the machine nacelle or on the tower with a fastener. The fastening of the drive has at least one friction surface for the clamping of the drive so that the drive can be moved in the fastening as of a specified mechanical load. An overloading of the drive is hereby avoided. A sensor system is also provided, which registers a movement of the drive in the fastening and in this case sends a signal to the system controller and/or a monitoring center.

A controller for an azimuth drive of a wind power plant, with which the load of the azimuth system is reduced, is known from EP 2 037 119 A1.

BRIEF DESCRIPTION OF THE INVENTION

The object of the present invention is to specify a wind power plant and a method for operating a wind power plant by means of which safe operation is possible, wherein preferably small dimensioned electric motors should be used to move moveable parts of the wind power plant.

This object is solved through a wind power plant with a rotor and at least one angle-adjustable rotor blade and an electric motor, in particular an asynchronous motor, for the movement of a moveable part of the wind power plant, wherein the wind power plant also has a control device, wherein a measurement device for determining the load of the electric motor is provided, wherein the control device reduces the load on the motor when a specifiable or preselectable first load limit is exceeded by reducing the rotational speed of the rotor, by changing the blade angle of the at least one rotor blade and/or by reducing the output of the wind power plant.

In the following the wording preselectable is used, which also has the meaning of specifiable.

According to the invention, a regulation and/or control intervention in one parameter of the wind power plant is performed, which ensures that high torsional moments, for example a tower torsion, which produce excessive torques on the electric motors driving moveable parts of the wind power plant, are reduced. This can occur, for example, by reducing the rotational speed of the rotor, by changing the blade angle of the at least one rotor blade and/or by reducing the output of the wind power plant. In the case of an output reduction of the wind power plant, for example due to the drawing of less power from the generator or in the case of a rotational speed reduction and a pivoting of the rotor blades towards the feathering position, the tower torsion and thus also the torque on the electric motor are considerably reduced. This ensures secure operation of the wind power plant. Furthermore, a smaller sized motor can be used.

The load on the electric motor is preferably regulated at a value below the preselectable first load limit. This ensures even more secure operation of the wind power plant. The strength of the change to the measure, which leads to the reduction in the load of the electric motor, preferably depends on the deviation of the load from the first load limit, wherein less deviation means less intervention and greater deviation means greater intervention. A control algorithm, which mainly corresponds with a PID controller or which is a PID controller, is preferably used for controlling.

It is particularly preferred that the moveable part is a nacelle of the wind power plant that is arranged on a tower and its azimuth angle can be changed by the electric motor and or that the moveable part is the at least one angle-adjustable rotor blade and the movement called by the electric motor is an angle adjustment of the blade angle. The electric motor, which is preferably an asynchronous motor, is then for example an azimuth angle adjusting motor or a pitch angle adjusting motor. Several motors can also be provided to adjust the azimuth angle of the tower head or the nacelle and accordingly several motors can also be provided to adjust the blade angle of the rotor blade.

Preferably, for reducing the load on the electric motor, an in particular periodic blade angle adjustment of the at least one rotor blade and/or another rotor blade, which exerts a force on the moveable part in a predefined direction of movement that represents the specified movement direction through the motor, occurs. The motor is thereby supported by the force driving the movable part. The force impacting the movable part by the blade angle change is, thus, aimed in the direction of the movement evoked by the electric motor or at least one component of the direction of the force goes in the direction of the movement evoked by the electric motor. The action, which serves for example to achieve the azimuth movement of the nacelle or the tower head of the wind power plant in EP 1 362 183 B1, is hereby used. In contrast to EP 1 362 183 B1, the support of the force evoked by blade angle changes is only applied when a corresponding load on the electric motor is present and needs to be reduced. In accordance with the invention, this additional force from the blade angle change is, thus, used to push the load on the electric motor below a limit value or to hold it below a limit value characteristic line.

The reduction in the output of the wind power plant is preferably brought about by a reduction in the torque of a generator. The generator is typically flanged in the nacelle on or onto the rotor or on or onto the shaft of the rotor and connected via a gear box or without a gear box. The purpose of the generator is to create electrical energy. An asynchronous generator is preferably provided.

The measurement device is preferably a rotational speed measurement device of the electric motor, a current measurement device for the current that flows in or to the electric motor and/or a torque measurement device for measuring the torque, which is exerted on the electric motor or which the electric motor exerts on the moveable part. The current measurement device measures, for example, the current that flows in the electric motor or that flows to the electric motor.

The first preselectable load limit is preferably a characteristic line of load values that lie below the trigger characteristic line of a motor protection switch of the electric motor. The trigger characteristic line of the motor protection switch is, for example, a characteristic line in a time current diagram. The trigger characteristic line is reached or exceeded when a corresponding current has flowed over a certain period of time. A type of integral current value is thus used, in which an integral from an assessed current, which flows over a corresponding time, is formed. The characteristic line thereby approximately shows the heating of the motor based on the current flowing through the motor. The motor protection switch can also be a motor protection relay, which reacts precisely to the motor temperature. For example, a temperature sensor can also be provided, which then switches the motor protection relay. Thus, for example, a motor protection relay TeSys of type LRD12 from the company Telemechanique can be used, which is set, for example, to 4 A and is thus triggered in the case of a symmetrical three-pole load from a warm operating state with a current of 2 A after approx. 30 s and/or 8 A after approx. 15 s. In the case of a symmetrical three-pole load from a cold state, the motor protection switch is then triggered after approx. 1 min.

The characteristic line of the load value of the first preselectable load limit is preferably approx. 70% to 95% of the characteristic line of the motor protection switch and in particular 80% to 90% of the characteristic line of the motor protection switch. A characteristic line that lies below the characteristic line of the motor protection switch is thus recreated for the load limit so that the load on the motor is reduced in a timely manner before the motor protection switch is triggered.

The movement of the moveable part by the motor is preferably interrupted for a preselectable period upon reaching the first load limit or a second load limit, which lies in particular above the first load limit. The second load limit also preferably lies below the characteristic line of the motor protection switch, which leads to the triggering of the motor protection switch.

A device for the restart of the electric motor, in particular automatically, is preferably provided in order to restart the motor after the motor protection switch has been triggered. This advantageously occurs via remote monitoring. It may be that the motor protection switch is triggered in a manner functionally similar to a water boiler when the motor becomes too hot and resets itself once the motor has cooled back down. When the motor protection switch is triggered, a signal indicating either that the motor can no longer be used to change the azimuth angle or accordingly a pitch angle motor is no longer in operation is sent to the operations center or to the control device of the wind power plant.

The motor protection switch is preferably part of the safety chain or a safety shutdown device of the wind power plant so that the triggering of the motor protection switch immediately leads to the shutdown of the wind power plant.

According to the invention, an energy supply system with at least one wind power plant, in particular preferably with the characteristics according to the invention described above and/or with a rotor and at least one angle-adjustable rotor blade and an electric motor, in particular an asynchronous motor, for the movement of a moveable part of the wind power plant is provided, wherein the wind power plant also has a control device, wherein a safety shutdown device is provided in the wind power plant, in which a motor protection switch of the electric motor is integrated, wherein the safety shutdown switch emits a signal to shutdown the wind power plant when the motor protection switch is triggered and wherein the wind power plant will be or is released for restart by means of an operating device that is spatially separated from the wind power plant.

According to the invention, the operating device (42) that is separated from the wind power plant (10) can also release the electric motor so that it can once again ensure that a moveable part moves in the wind power plant, such as the nacelle or the tower head or a rotor blade with respect to the adjustment angle (pitch angle).

Particular reference is made to DE 10 2006 034 251 A1, which should be included in full in the disclosure content of this patent application. In DE 10 2006 034 251 A1, a method for operating a wind power plant is disclosed, wherein the wind power plant will be or is shut down after the triggering of a shutdown signal by a safety shutdown device, wherein the wind power plant is released for operation after a safety shutdown by means of an operating device that is spatially separated from the wind power plant. According to the invention, it has now become known that, in particular, the inclusion of the motor protection switch in the safety shutdown device is also a very efficient action for increasing the safety of the wind power plant, wherein a safe and cost-efficient operation is possible through a restart by means of an operating device as described in DE 10 2006 034 251 A1, which is spatially separated from the wind power plant.

This document also describes a corresponding energy supply system with at least one wind power plant, which has an operating device that is spatially separated from the wind power plant such that the wind power plant will be or is released after a safety shutdown by means of the operating device. According to the invention, the motor protection switch of the electric motor is provided in the safety shutdown switch such that the safety shutdown of the wind power plant takes place when the motor protection switch is triggered.

Alternatively, according to the invention, an energy supply system is provided with at least one wind power plant, which is described above as inventive, and/or with at least one wind power plant with a rotor and at least one angle-adjustable rotor blade and an electric motor, in particular an asynchronous motor, for the movement of a moveable part of the wind power plant, wherein the wind power plant also has a control device, wherein a motor protection switch of the electric motor is arranged outside a safety shutdown device of the wind power plant. Through the removal of the motor protection switch from the safety shutdown device or the safety chain, it is possible to ensure that the wind power plant can continue to be safely operated without a safety shutdown and can, if applicable, also continue to be used to supply power, even when the motor protection switch is triggered.

The triggering of the motor protection switch preferably generates a signal that is sent to a control device. The control device is preferably designed to determine whether a safety shutdown of the wind power plant is necessary.

After triggering the motor protection switch, the control device then takes the appropriate measures, for example the shutdown of the wind power plant, when the output of the other motors no longer suffices to adjust the pitch angle or the azimuth angle or when, for example, the nacelle does not need to be or cannot if applicable be yawed due to the wind direction. It should generally be expected that similar loads prevail for other motors. However, it does not necessarily need to be the case that all motor protection switches of all motors are triggered for the movement of a moveable part.

Thus, it is currently such that up to 8 electric motors are already used to move or turn the nacelle with respect to its azimuth angle. One or two motors are common for the adjusting of the pitch angle of the rotor blade. Thus, a shutdown of the wind power plant should be expected directly when one pitch angle motor fails. If one azimuth angle motor fails, the wind power plant can potentially continue to operate, for example if the other motors are sufficiently functional and wind gusts are not too strong or no or only very small angle changes of the nacelle are necessary. In this case, it may be that the wind power plant does not need to be shut down at all, since after the triggering or switching of the motor protection switch of a motor, which is provided to change an azimuth angle, it can be restarted remotely after the motor has cooled.

The electric motor is preferably restarted after a preselectable period of time or when the temperature of the electric motor falls below a preselectable temperature via the control device or remotely via the control device that is separate from the wind power plant.

The object is also solved through a method for operating a wind power plant with a rotor and at least one angle-adjustable rotor blade and an electric motor, in particular an asynchronous motor, and with a control device with the following method steps:

Movement of a moveable part of the wind power plant with the electric motor,

Measurement of the load on the electric motor and

Reduction of the load on the electric motor if a first preselectable load limit was exceeded, wherein the reduction of the load occurs through a reduction in the speed of the rotor, through a change in the blade angle of the at least one angle-adjustable rotor blade and/or through a reduction in the output of the wind power plant.

The electric motor is preferably stopped when a third preselectable load limit is exceeded for a preselectable time, before the reduction of the load on the electric motor, wherein the steps of the movement of the moveable part with the electric motor, the measurement of the load on the electric motor and the reduction of the load on the electric motor when the first specifiable load limit was exceeded are executed afterwards. The electric motor is hereby first stopped or no longer supplied with power after the movement of a moveable part of the wind power plant with the electric motor and the measurement of the load of the electric motor. After the restart of the motor, that is after new movement of the moveable part of the wind power plant with the electric motor and measurement of the load on the electric motor, the reduction of the load on the electric motor, if applicable, is then performed, if a first preselectable load limit was exceeded, wherein the reduction of the load occurs through a reduction in the rotational speed of the rotor, a change in the blade angle of the at least one angle-adjustable rotor blade and/or a reduction in the output of the wind power plant.

The first preselectable load limit preferably correspond with the third specifiable load limit. The third preselectable load limit can however also lie below the first preselectable load limit. An overload of the electric motor is hereby very efficiently avoided. To stop the motor, the power fed to the motor or the voltage supplied to the motor can be reduced or set to 0 A or 0 V, respectively.

The load on the electric motor is preferably regulated at a value below the preselectable first load limit.

The moveable part is preferably a nacelle of the wind power plant, which is arranged on a tower and the azimuth angle of which is changed by the electric motor, and/or the moveable part is the at least one angle-adjustable rotor blade, wherein the electric motor adjusts the blade angle.

Preferably, an in particular periodic blade angle adjustment of the at least one rotor blade or another rotor blade, which exerts a force on the moveable part in a direction of movement evoked by the electric motor, occurs for reducing of the load on the electric motor.

The reduction in the output of the wind power plant is preferably brought about by a reduction in the torque of a generator.

The load is preferably measured or determined by measuring the rotational speed of the electric motor, the power flowing in or to the electric motor and/or the torque, which acts on the electric motor or which the electric motor exerts on the moveable part.

The first preselectable load limit is preferably a characteristic line of load values that lie below the trigger characteristic line of a motor protection switch of the electric motor.

The movement of the moveable part is preferably interrupted by the motor for a preselectable period upon reaching the first load limit or a second load limit, which lies, in particular, above the first load limit. This is based on the knowledge that temporary non-movement of the motor does not or hardly causes an increased load for the wind power plant.

The object is also solved through a method for operating of a wind power plant with a rotor and at least one angle-adjustable rotor blade and an electric motor, in particular an asynchronous motor, and with a control device, which has in particular, characteristics of the method described above according to the invention, wherein the electric motor has a motor protection switch, which is integrated in a safety shutdown switch, wherein when the motor protection switch is triggered, the safety shutdown switch emits a signal to shut down the wind power plant, whereupon the wind power plant will be or is shut down, wherein the wind power plant is released for operation after the shutdown by means of an operating device that is spatially separated from the wind power plant.

The object is also solved through a method for operating a wind power plant with a rotor and at least one angle-adjustable rotor blade and an electric motor, in particular an asynchronous motor, and with a control device, wherein in particular the method characteristics described above according to the invention are provided, wherein the electric motor has a motor protection switch, which is arranged outside a safety shutdown device of the wind power plant, wherein a signal is generated when the motor protection switch is triggered, which is sent to a control device.

The control device preferably determines whether a safety shutdown switch for the wind power plant is necessary, wherein a safety shutdown is performed if determined to be necessary.

Furthermore, the electric motor is preferably restarted automatically after a preselectable period of time or when the temperature falls below a preselectable temperature via the control device or remotely via the control device that is separate from the wind power plant.

In the event that the motor protection switch is triggered, the motor is preferably, in particular automatically, restarted after a preselectable criterion. The criterion for the restart is preferably the elapse of a preselectable period of time or the cooling of the motor so that the motor protection switch switches, especially itself, back on.

The criterion for a restart can also be an absolutely necessary movement of the moveable part in order to perform safety-relevant movements, which prevent the destruction of the rest of the wind power plant. Another criterion can be that the operation of the wind power plant was not stopped by the control device or respectively the control system through the shutdown of the motor or respectively the triggering of the motor protection switch, for example because an azimuth yawing was not necessary during the shutdown of the motor and also otherwise no sensor generates a signal, which shows lack of functionality of the motor, which previously has been shut down by the motor protection switch.

In this case for example, the electric motor can also be switched back on remotely so that it can be restarted accordingly by the control device. Alternatively, the motor can start up automatically after corresponding cooling and startup of the motor protection switch, without receiving a special start signal by the control device.

The switching on of the motor protection switch hereby occurs automatically upon cooling or after a corresponding period of time, which can be preselectable, so that the motor can be started when an appropriate voltage and a corresponding control signal of the control device are applied. The applied control signal can also have been applied during the time when the motor was shut down so that a special start signal from the control device is not necessary for the motor to be restarted.

The object is also solved through a wind power plant, which has a rotor, at least one angle-adjustable rotor blade and at least one electric motor, wherein the electric motor is provided for the yaw drive of a nacelle on a tower of the wind power plant.

The wind power plant according to the invention, which is preferably designed according to the above or like the wind power plants according to the invention and/or preferred wind power plants, has the characteristic that a current, which flows in the at least one electric motor, is provided as an input signal for a controller, which is provided for the—in particular cyclical—setting of an angle of the at least one angle-adjustable rotor blade. Thus, according to the invention, a current signal of the azimuth drive serves as the input of a pitch controller.

The sum of the currents which flow in several electric motors, which serve for the yaw drive of the nacelle, preferably serves as current, which serves as the input signal for a controller for the, in particular, cyclical setting of an angle of the at least one angle-adjustable rotor blade.

The invention is, in particular, suitable for the adjustment of the azimuth angle of the nacelle since in particular there the used electric motors are exposed to extremely high loads, for example because of turbulent winds. Turbulent winds namely do not necessarily lead to greater forces for the motors, which are necessary for the adjustment of the blade angle, but rather to a permanent load on the blade angle adjustment motors. On the other hand, the forces, which impact the motors, which should adjust the azimuth angle of the nacelle in turbulent winds, are much higher. Specifically in the case of these motors, the invention is particularly suitable since considerably smaller motors can be used, since the load is considerably minimized by the invention.

BRIEF DESCRIPTION OF THE DRAWINGS

The invention is described below, without restricting the general intent of the invention, based on exemplary embodiments in reference to the drawings, whereby we expressly refer to the drawings with regard to the disclosure of all details according to the invention that are not explained in greater detail in the text. The drawings show in.

DETAILED DESCRIPTION OF THE INVENTION

In the following figures, the same or similar types of elements or respectively corresponding parts are provided with the same reference numbers in order to prevent the item from needing to be reintroduced.

Figure 1:
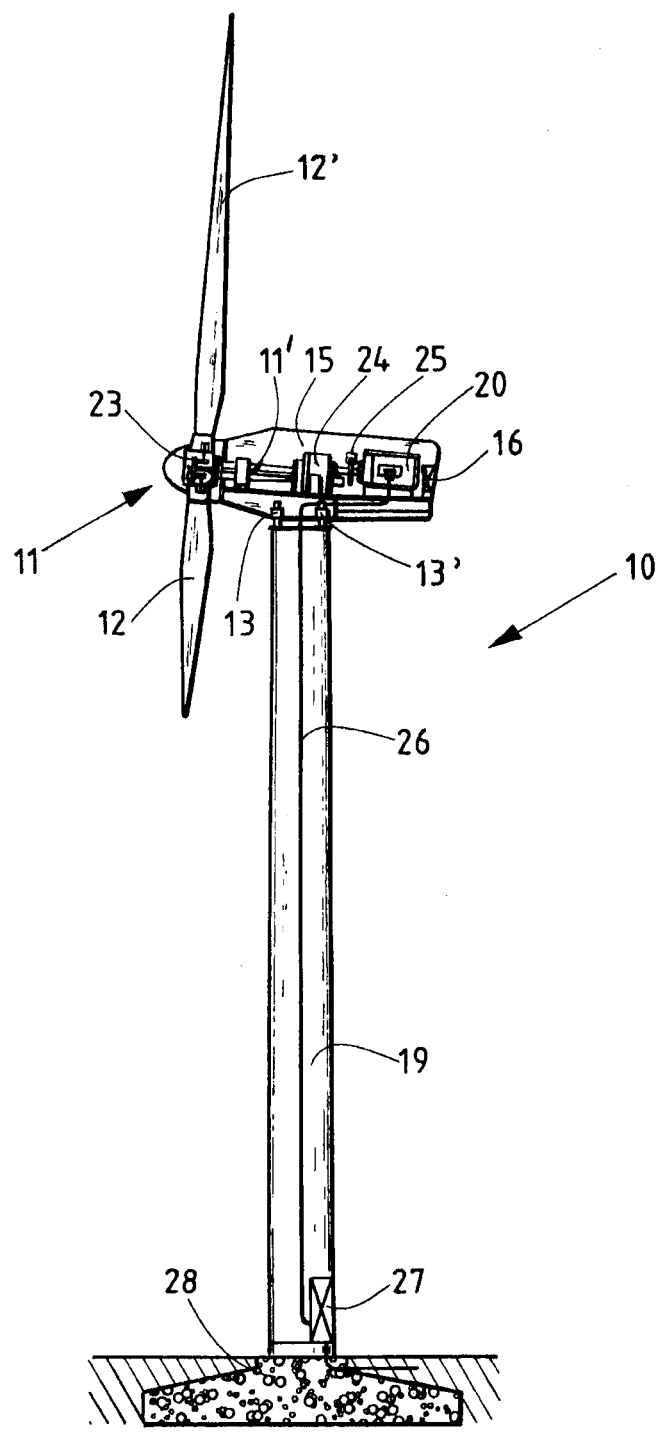
FIG. 1 a schematic representation of a conventional wind power plant.

FIG. 1 shows a schematic representation of a wind power plant 10. The wind power plant 10 has a rotor 11 or a rotor shaft 11', on which normally three rotor blades 12, 12' are arranged, of which only two are shown in FIG. 1. The blade angles of the rotor blades 12, 12' are adjustable. The blade angle is also normally called the pitch angle. The adjustment is normally performed by electric motors i.e. at least one motor per rotor blade 12, 12', which are not shown in FIG. 1. The motor 14 from FIG. 3 could for example be this type of blade angle adjustment motor. Two or more electric motors can also be provided per rotor blade 12, 12' for the adjustment of the blade angle.

The adjustment of the blade angle serves to optimally tap power, which is provided by the wind on the wind power plant, through the rotor blade. Moreover, the blade angle adjustment serves to reduce power draw and thus also the load on the wind power plant in the case of high wind speeds.

The wind power is converted to a rotation of the rotor 11 via the rotor blades 12, 12'. A generator 20 is driven via a gear box 24, which is passed to an electrical connection 27 via a power cable 26, which is fed through the tower 19. A transformation to a high voltage, which is then fed to a network, takes place there. The tower 19 is built on a foundation 28 and in the upper area carries the nacelle 15, which has the corresponding provided components. A wind power plant 10 can also be provided without a gear box 24. Furthermore, a rotor brake 25 is normally also provided on the fast shaft between gear box 24 and generator 20. A control device 16, which regulates and/or controls the wind power plant 10, is also provided in the nacelle 15.

Figure 2:
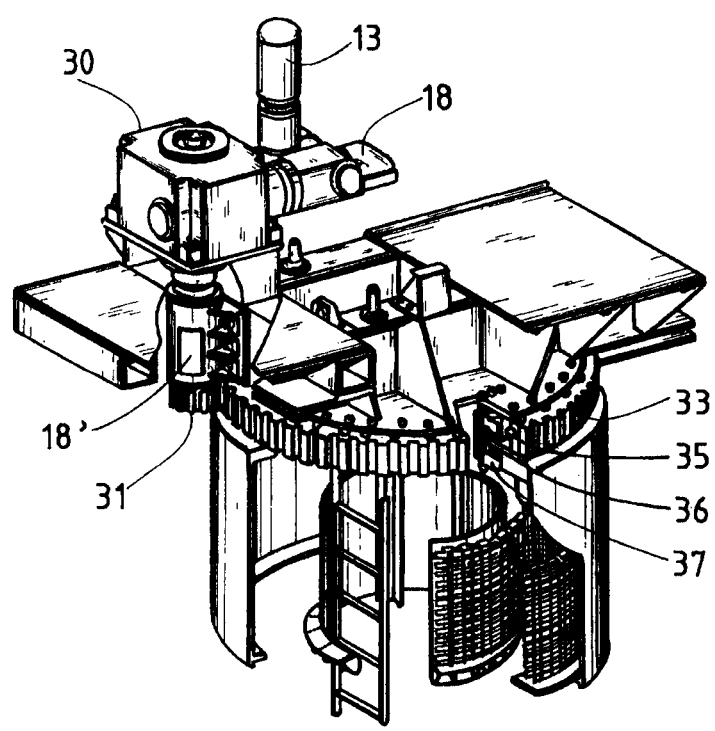
FIG. 2 a schematic three-dimensional representation of an azimuth angle yaw drive, FIG. 3 a schematic representation of a part of a wind power plant according to the invention, FIG. 4 a schematic representation of a curve progression of the blade angle of three rotor blades over time, FIG. 5 a curve of the resulting tower torsional moments in kNm over time, FIG. 6 a curve progression showing the blade angle of three rotor blades during cyclical blade adjustment according to the invention, and FIG. 7 a schematic curve progression of a tower torsional moment resulting from the cyclical blade adjustment from FIG. 6 in kNm over time.

The nacelle 15 can be yawed in the direction of the wind via electric motors 13, 13'. An example for a corresponding yaw drive of the nacelle 15 is shown in FIG. 2 in a schematic and three-dimensional manner. FIG. 2 only shows an electric motor 13. FIG. 1 shows two electric motors 13, 13'. Up to eight electric motors are used for the azimuth drive of the nacelle or the yaw drive in modern 2 MW to 5 MW wind power plants.

A yawing of the nacelle 15 takes place for one to avoid loads on the wind power plant 10 due to a diagonal wind inflow and also to increase the power output, since the maximum power output can be achieved from a given wind when the wind power plant faces into the wind. Since wind direction changes occur relatively frequently and quickly, the wind direction change is integrated in the case of e.g. wind direction changes of up to 15° for several minutes and the azimuth angle of the nacelle is only yawed in the case of sustained wind direction changes. The yawing speed normally lies within the range of 0.1°/s to 0.5°/s, preferably 0.3°/s. In the case of strong wind direction changes of up to 40° or 50°, the yawing is not delayed for several minutes but is rather started immediately. Turbulent winds can lead to very high loads on the wind power plant and can also exert very high azimuthal forces on the nacelle, which can lead to heavy load on the electric motors 13, 13' and the gear box 30 of the electric motors 13, 13'.

As mentioned, FIG. 2 shows a schematic three-dimensional representation of a yawing system of the azimuth angle of the nacelle 15. A motor 13 is operatively connected with a sprocket 33 via a gear box 30 and a pinion 31. The transmission of the gear box lies in the range of 1:100 to 1:400 so that the pinion 31 turns with a factor of 1:100 to 1:400 of rotational speed with respect to the motor. The azimuth angle of the nacelle 15 is hereby changed via rotation on the azimuth bearing.

A brake ring 36 with brakes 37 is provided in order to secure the nacelle 15 against unwanted rotations from forces impacting the nacelle. The brakes 37, which can be operatively connected with the brake ring 36, also serve to avoid oscillations during the azimuth angle adjustment or the nacelle yawing.

A measurement device 19, which measures, for example, the rotational speed of the motor 13, is provided on the motor 13. A control device, which is for example specified with 16 in FIG. 1 and with 17 in FIG. 3, respectively, can now compare a set rotational speed with the actually measured current rotational speed. When a specifiable rotational speed difference is exceeded, a corresponding load on the electric motor is assumed and leads according to the invention to a reduction of the load on the electric motor through corresponding control interventions, which were described above. Accordingly, the measurement device 18 can also serve to measure the current, which flows in the motor or to the motor. After a measured current exceeds a preselectable value, the reaching of a load limit is also assumed so that a control intervention takes place, which leads to a reduction in the load on the electric motor. Alternatively or additionally, a motor temperature could also be measured and a control intervention could also take place after a preselectable temperature is reached.

The measurement device 18' can, for example, serve to determine the rotational speed of the pinion 31. Accordingly, a difference between a set value of the rotational speed and a current value can also be evaluated here and the reaching of a first load limit or a second load limit of the electric motor can be assumed in the case of a corresponding difference. Finally, it is also possible to determine, for example, the torque of the motor 13 or of the pinion 31 with the measurement devices 18 or 18', respectively, and, when a corresponding torque is exceeded, the control device is then reduced according to the load on the electric motor 13 through corresponding interventions, which are described above.

It is possible through the measures according to the invention to make the electric motors 13, 13', 14, which are used to move moveable parts of the wind power plan and in particular the azimuth drives, smaller than was previously possible. With the invention, wind power plants already constructed in this manner can be operated in difficult wind zones, for example when there are very strong wind gusts and turbulent winds.

Figure 3:
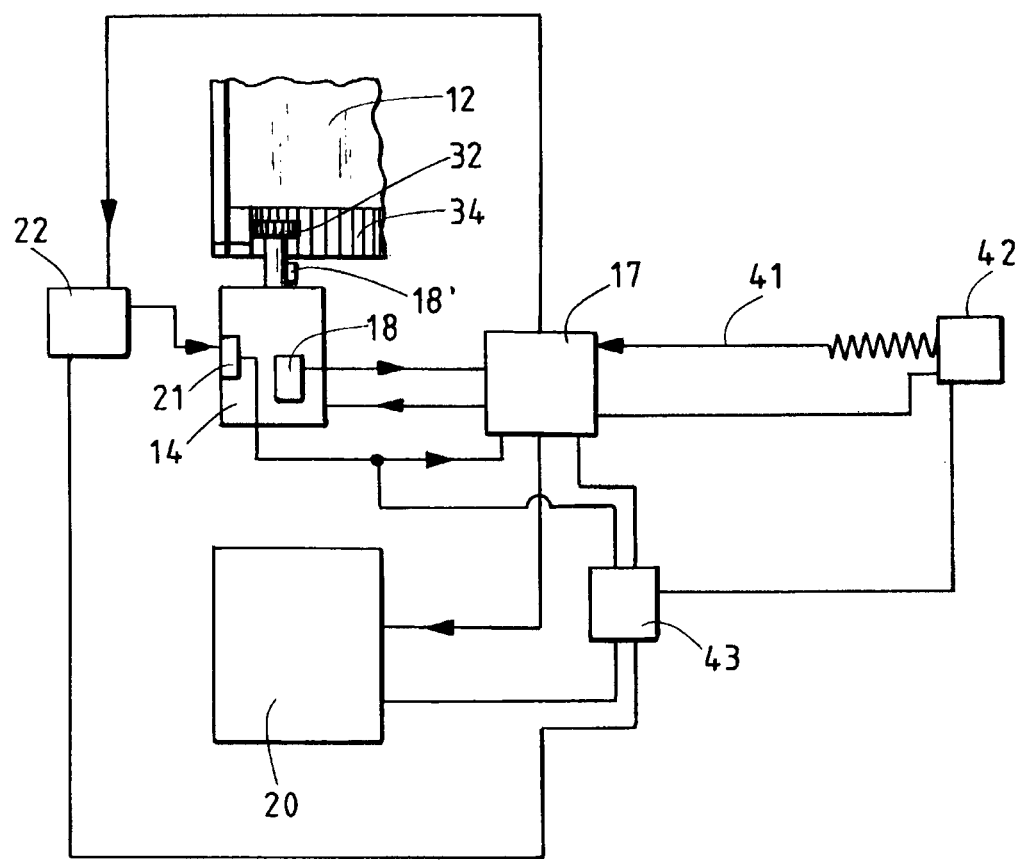

FIG. 3 shows a schematic representation of a part of a wind power plant according to the invention, wherein in this example a rotor blade 12 is turned via a sprocket 34 and a corresponding pinion 32 in its rotor blade angle. The rotor blade angle is a rotation angle around a longitudinal axis of the rotor blade.

A measurement device 18 and a measurement device 18' are also shown in this exemplary embodiment according to FIG. 3, wherein the measurement device 18 measures, for example, a current value in the motor 14 and feeds this value to the control device 17. The control device 17 can then shut down the motor 14 accordingly, especially in a controlled manner.

Also in this exemplary embodiment according to FIG. 3, the measured current values can be processed in the control device such that they are compared with a characteristic line when a measurement device 18 is provided, which measures a current value in the motor or a current value, which is fed to the motor, wherein the motor is the motor, which adjusts the blade angle, but also the motor, which adjusts the azimuth angle. The current values can, for example, be integrated in the control device 16, 17 over time, wherein the time duration can be different depending on the current level such that a characteristic line is reproduced, which corresponds with a characteristic line of a motor protection switch, but lies below it. The triggering of the motor protection switch can hereby be very efficiently prevented.

According to the invention, the torque generated by the generator 20 can also be reduced in order to reduce the load on the motor 14. Should it come to a shutdown of the motor, for example, via a motor protection switch 21, a corresponding signal is fed to the control device 17 and the wind power plant can then, for example, be shut down. In the case that the moveable part driven by the motor 14 is not a rotor blade 12 like in FIG. 3, but rather a nacelle 15, it can make sense that the control device 17 does not shut down the wind power plant, but rather keeps it running in order to wait for the operating temperature of the motor 14 to drop again so that either via a startup device 22, which can be driven by control device 17, the motor protection switch 21 is switched on again and the motor 14 is restarted or the control device 17 receives a corresponding signal remotely such that the motor protection switch 21 is switched on again. Remote access is indicated by the arrow 41.

The motor protection switch 21 can also be designed such that it switches back on automatically after cooling and the motor 14 is started when a corresponding signal for an operation of the motor 14 is received from the control device 17. The control device 17 can, for example, also send a continuous regulation or control command to the motor 14 to execute a movement while the motor 14 is shut down. However, it may also be that a corresponding signal is sent to the control device 17, only after the motor protection switch 21 is turned back on, which then sends a movement request of the motor 14, when for example, the blade angle needs to be changed or an azimuth yawing of the nacelle 15 needs to be performed.

Additionally, FIG. 3 shows the optional version, in which an operating device 42 that is separated from the wind power plant is provided. Particular reference is made to DE 10 2006 034 251 A1, which should be included in full. In particular the exemplary embodiment described in FIG. 2 of the aforementioned patent application and the associated figure description should be fully included in this patent application.

FIG. 3 provides an optional safety shutdown device 43 that is connected with the motor protection switch 21. As soon as the motor protection switch 21 is triggered, it can be provided that the safety shutdown switch 43 provides the safety shutdown of the wind power plant. Accordingly, a safety shutdown signal is sent from the safety shutdown device 43 to the operating device 42. When the wind power plant is switched back on, a corresponding blocking signal in the safety shutdown device 43 is released for example by the operating device 42. The release of the blocking signal is for example then transmitted to the control device 17 and to the startup device 22. The generator 20 is also connected with the safety shutdown device 43, when for example, a safety-relevant process occurs, which demands a safety shutdown. In this case, a corresponding signal is transmitted to the safety shutdown device 43. The safety shutdown device 43 is only shown here schematically. This is a hardware chain or safety chain of series-connected switches (also see FIG. 3 in DE 10 2006 034 251 A1 and the associated description). As soon as a or one switch has been triggered or opened, a signal is generated, which leads to a safety shutdown of the wind power plant.

According to the invention, it can also be provided that a connection does not exist between the motor protection switch 21 and the safety shutdown switch 43, so that a triggering of the motor protection switch 21 does not necessarily lead to a safety shutdown of the wind power plant. In this case, the control device 17 or respectively an operator, who monitors the wind power plant on the operating device 42, can decide whether a safety shutdown is necessary.

Figure 4:
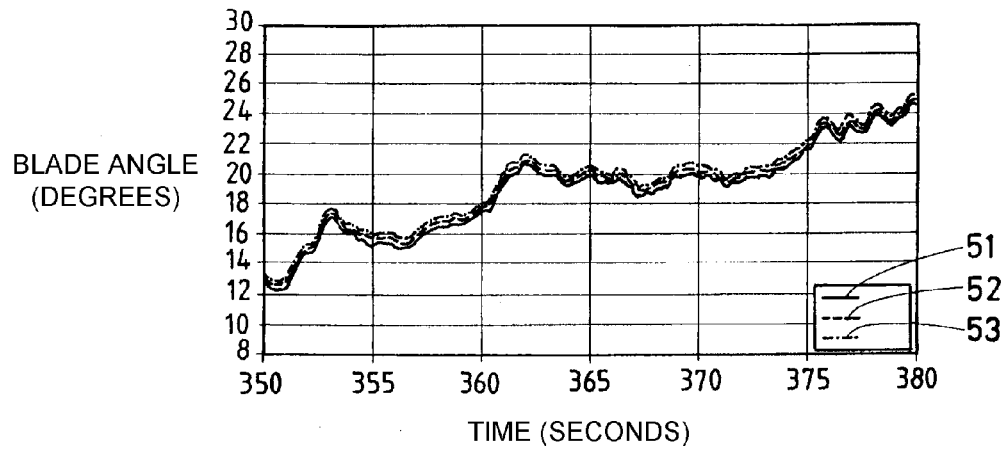

FIG. 4 shows a diagram of the progression of the blade angle of three rotor blades over time in seconds. They are shown with different represented curves 51, 52 and 53. A blade adjustment is hereby collectively performed. The correspondingly constant differences in angle of attack or blade angle can be understood as production tolerances, which are taken into consideration in the simulation. The respective angle is shown in degrees over time in seconds.

Figure 5:
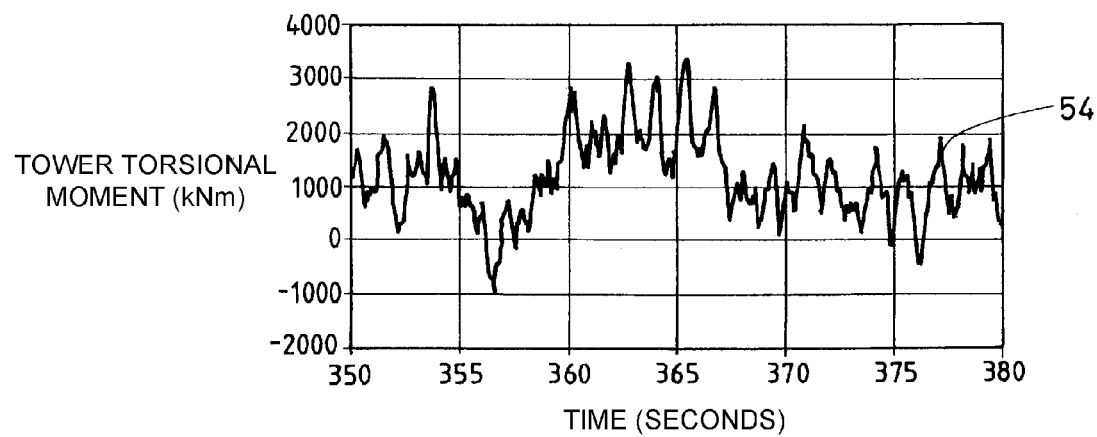

FIG. 5 shows for this (FIG. 4) the curve progression of the tower torsional moment in kNm over time. Also here, the time is shown in seconds. It can be seen that the collective rotor blade adjustment leads to high loads on the wind power plant.

Figure 6:
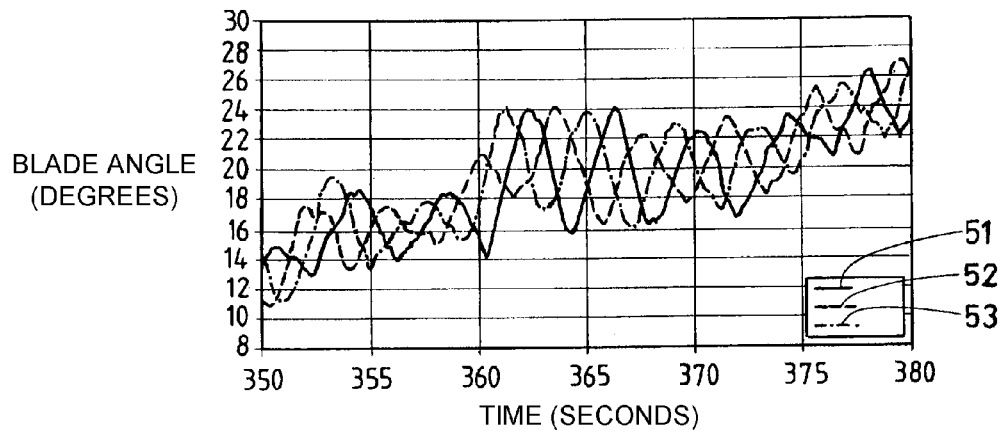

In contrast, a cyclical rotor blade adjustment is performed in FIG. 6 according to the invention, in which the measured current of the motors of the nacelle yaw drive, that is of the azimuth drives serves as the input size for the controller(s) for the blade adjustment. A controlled and cyclical blade adjustment takes place in particular. The measured current in the motor can hereby be used or the sum of the measured currents of several motors or an average value of the measured currents. The average value can also be made up of weighted measured currents in order to assess a higher load on a motor with a higher weighting. Through the use of the current of at least one motor of the nacelle yaw drive, for example the load on the wind power plant in the case of changing weather directions, is considerably reduced as in FIG. 7.

Figure 7:
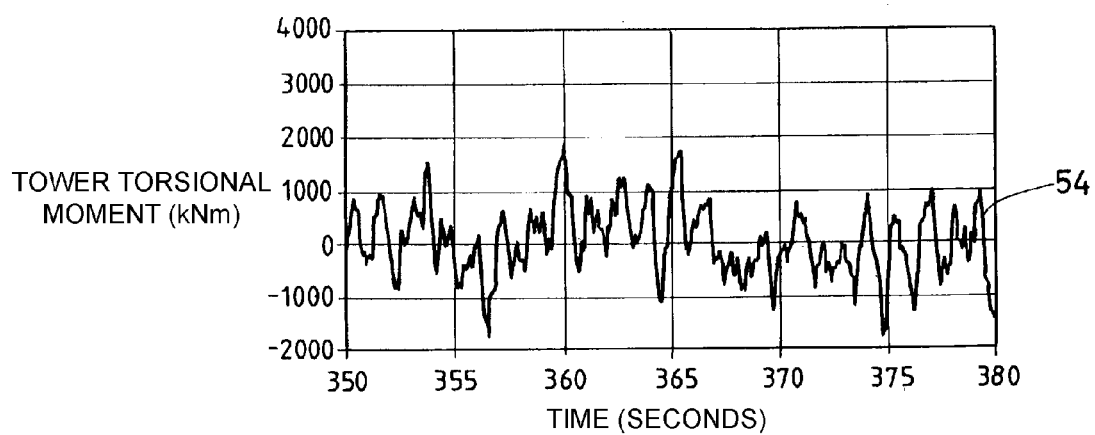

Again, the tower torsional moment, in particular the tower head torsional moment in kNm is shown in FIG. 7 over time. It can be seen that this is clearly reduced. In comparison to the highest load of approximately 3450 kNm according to FIG. 5, the highest load is only approximately 1900 kNm in FIG. 7. Exact calculations lead to a reduction of the maximum load of 38%. The operating strength loads were reduced by 6%, which is a considerable improvement in the field of wind power plants. This can be seen by the fact that the load is more symmetric with small variations to the time axis in FIG. 7 compared to FIG. 5.

Through the use of the current in the motors as an input parameter for the controller, an input value that is very easy to capture and measure is used. The difference between the measured current and a preselectable maximum current is preferably used as an input parameter. The cyclical blade adjustment is preferably switched on or used to support the azimuth drive only when a preselectable measurement variable of a drive load exceeds another preselectable limit value. In this manner the loss of energy yield is minimized by cyclic pitching or cyclic blade angle adjustment, e.g. below rated wind speed. This method, in conclusion, controls and/or limits the current of the yaw drive system by cyclical pitching or cyclical blade angle adjustment.

All named characteristics, including those taken from the drawings alone, and individual characteristics, which are disclosed in combination with other characteristics, are considered alone and in combination as important to the invention. Embodiments according to the invention can be fulfilled through individual characteristics or a combination of several characteristics.

LIST OF REFERENCES

10 Wind power plant
11 Rotor
11' Rotor shaft
12, 12' Rotor blade
13, 13' Motor
14 Motor
15 Nacelle
16 Control device
17 Control device
18, 18' Measurement device
19 Tower
20 Generator
21 Motor protection switch
22 Startup device
23 Rotor hub
24 Gear box
25 Rotor brake
26 Power cable
27 Electrical connection
28 Foundation
30 Gear box
31 Pinion
32 Pinion
33 Sprocket
34 Sprocket
35 Azimuth bearing
36 Brake ring
37 Brake
41 Remote access
42 Operating device
43 Safety shutdown device
51 Blade angle curve of the $1^{st}$ rotor blade
52 Blade angle curve of the $2^{nd}$ rotor blade
53 Blade angle curve of the $3^{rd}$ rotor blade
Tower torsional moment [kNm]

The invention claimed is:

1. A wind power plant comprising:
a rotor including at least one angle-adjustable rotor blade,
an electric asynchronous motor for movement of a nacelle that is carried by a tower of the wind power plant, wherein the rotor is mounted to the nacelle; a control device that controls the electric asynchronous motor;
a measurement device for determining a load of the electric asynchronous motor;
a motor protection switch integrated with the electric asynchronous motor, wherein the motor protection switch selectively generates a motor protection switch signal when a trigger characteristic line of the motor protection switch is exceeded; and
a safety shutdown device that receives the motor protection switch signal from the motor protection switch, wherein the safety shutdown device shuts down the wind power plant upon receipt of the motor protection switch signal, wherein the control device reduces a torsion of the tower when the load exceeds a preselectable first load limit of the electric asynchronous motor by at least one of reducing a rotational speed of the rotor, changing a blade angle of the at least one angle-adjustable rotor blade and reducing a power of the wind power plant, wherein the preselectable first load limit is a characteristic line of values that is less than the trigger characteristic line of the motor protection switch.

2. The wind power plant according to claim 1, wherein the load on the electric asynchronous motor is controlled to a value below the preselectable first load limit.

3. The wind power plant according to claim 1, wherein an azimuth angle of the nacelle is changed by the electric asynchronous motor.

4. The wind power plant according to claim 3, wherein the reduction in the power of the wind power plant is caused by a reduction in a torque of a generator.

5. The wind power plant according to claim 1, wherein the measurement device is at least one of a rotational speed device of the electric asynchronous motor, a current measurement device, measuring current which flows in or to the electric asynchronous motor, and a torque measurement device for measurement of a torque that impacts the electric asynchronous motor or a torque that the electric asynchronous motor exerts on the nacelle.

6. The wind power plant according to claim 1, wherein the movement of the nacelle by the electric asynchronous motor is interrupted for a preselectable period of time.

7. The wind power plant according to claim 6, wherein the electric asynchronous motor is interrupted when the preselectable first load limit or a second load limit is reached, wherein the second load limit is greater the preselectable first load limit, and wherein a device is provided for restart of the electric asynchronous motor after the motor protection switch has been triggered.

8. The wind power plant according to claim 1, wherein the electric asynchronous motor is provided for yawing of the nacelle, and wherein a current, which flows to the electric asynchronous motor, is provided as an input signal for a controller, which is provided for setting the angle of the at least one angle-adjustable rotor blade.

9. The wind power plant according to claim 8, wherein additional asynchronous motors are used for the yawing of the nacelle and the current is the sum of the currents that flow in the several electric asynchronous motors (13, 1'1), which serve for the yawing of the nacelle.

10. The wind power plant of claim 8, wherein the setting of the blade angle of the at least one angle-adjustable rotor blade is cyclical.

11. An energy supply system with at least one wind power plant according to claim 1, wherein the wind power plant is released for restart by an operating device that is spatially separated from the wind power plant.

12. The energy supply system according to claim 11, wherein the electrical asynchronous motor is restarted automatically via the control device or remotely via the operating device that is separate from the wind power plant, after a preselectable period of time has elapsed or after a temperature of the electrical asynchronous motor has dropped below a preselectable level.

13. An energy supply system with at least one wind power plant according to claim 1, wherein the motor protection switch of the electric asynchronous motor is arranged outside the safety shutdown device of the wind power plant.

14. A method for operating a wind power plant, comprising the steps of:
providing a rotor with at least one angle-adjustable rotor blade, a motor protection switch integrated with an asynchronous electric motor, a control device, and a tower that carries a nacelle;
moving the nacelle with the electric asynchronous motor;
measuring a load on the electric asynchronous motor;

reducing a torsion of the tower when the load exceeds a preselectable first load limit by at least one of reducing a rotational speed of the rotor, changing a blade angle of the at least one angle-adjustable rotor blade, and reducing an output of the wind power plant, wherein the preselectable first load limit is a characteristic line of values that is less than a trigger characteristic line of the motor protection switch; and shutting down the wind power plant when the trigger characteristic line of the motor protection switch is exceeded.

15. The method according to claim 14, wherein before reducing the torsion of the tower, the electric asynchronous motor is stopped for a preselectable period of time when a third preselectable load limit is exceeded, wherein the steps of moving the nacelle with the electric asynchronous motor, measuring the load of the electric asynchronous motor, and reducing the torsion of the tower are executed afterwards if the preselectable first load limit is exceeded.

16. The method according to claim 15, wherein the load of the electric asynchronous motor is controlled to a value below the preselectable first load limit.

17. The method according to claim 14, wherein an azimuth angle of the nacelle is changed by the electric asynchronous motor.

18. The method according to claim 14, wherein the load is determined by at least one of a measurement of a rotational speed of the electric asynchronous motor, of current flowing in or to the electric asynchronous motor, and of a torque that is exerted on the electric asynchronous motor or a torque that the electric asynchronous motor exerts on the nacelle.

19. The method according to claim 14, wherein movement of the nacelle by the asynchronous motor is interrupted for a preselectable period of time.

20. The method of claim 16, wherein the asynchronous motor is interrupted when the preselectable first load limit or a second load limit is reached, wherein the second load limit is greater than the preselectable first load limit.

21. The method of claim 20, wherein the asynchronous motor is restarted according to a preselectable criterion after the motor protection switch is triggered.

22. The method of claim 14, wherein the motor protection switch is arranged outside a safety shutdown switch of the wind power plant, and wherein a signal that is sent to the control device is generated when the motor protection switch is triggered.

23. A method for operating a wind power plant, comprising the steps of:

providing a rotor with at least one angle-adjustable rotor blade, an electric asynchronous motor, a control device, and a tower that carries a nacelle;

providing the electric asynchronous motor with a motor protection switch that is arranged outside a safety shutdown switch of the wind power plant;

measuring a load on the electric asynchronous motor; and generating a motor protection signal from the motor protection switch that is sent to the control device, wherein the motor protection signal is generated when the load exceeds a trigger characteristic line of the motor protection switch;

reducing a torsion of the tower when the load exceeds a preselectable first load limit, wherein the preselectable first load limit is a characteristic line of values that is less than the trigger characteristic line of the motor protection switch; and shutting down the wind power plant when the trigger characteristic line of the motor protection switch is exceeded.

24. The method according to claim 23, wherein the electrical asynchronous motor is restarted automatically via the control device or remotely via an operating device that is separate from the wind power plant after a preselectable period of time has elapsed or after a temperature of the electrical asynchronous motor has dropped below a preselectable level.

25. The method of claim 23, wherein the characteristic line of values of the preselectable first load limit is equal to 80% to 90% of the trigger characteristic line of the motor protection switch.

* * * * *